Aug. 22, 1933.   O. U. ZERK   1,923,470
CENTRALIZED LUBRICATING SYSTEM
Filed Nov. 9, 1929   4 Sheets-Sheet 2
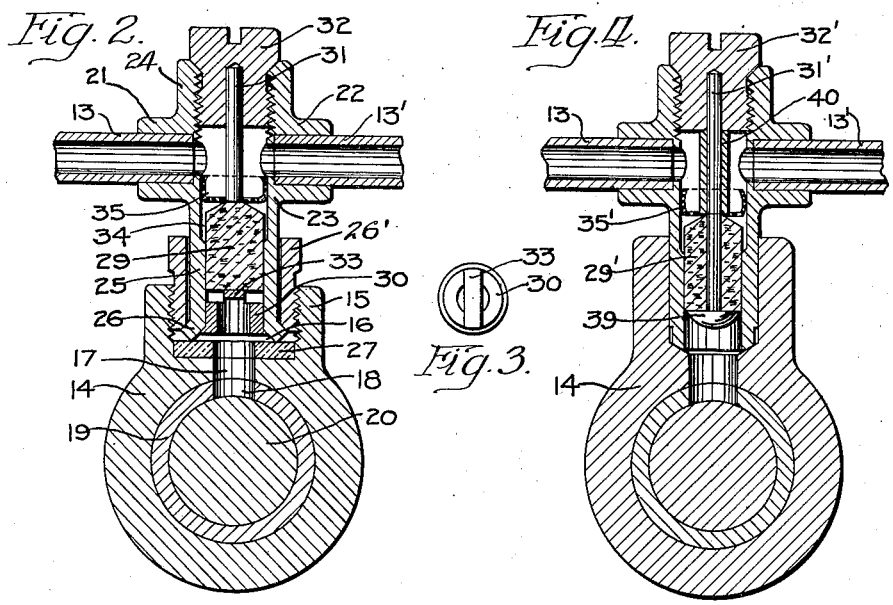
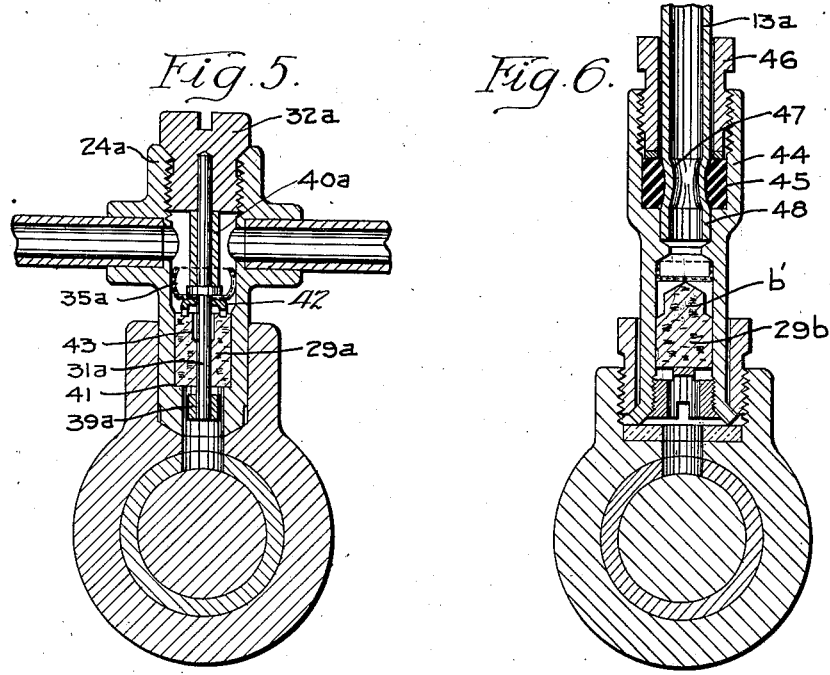
INVENTOR.
Oscar U. Zerk
BY Slough & Canfield
ATTORNEYS.

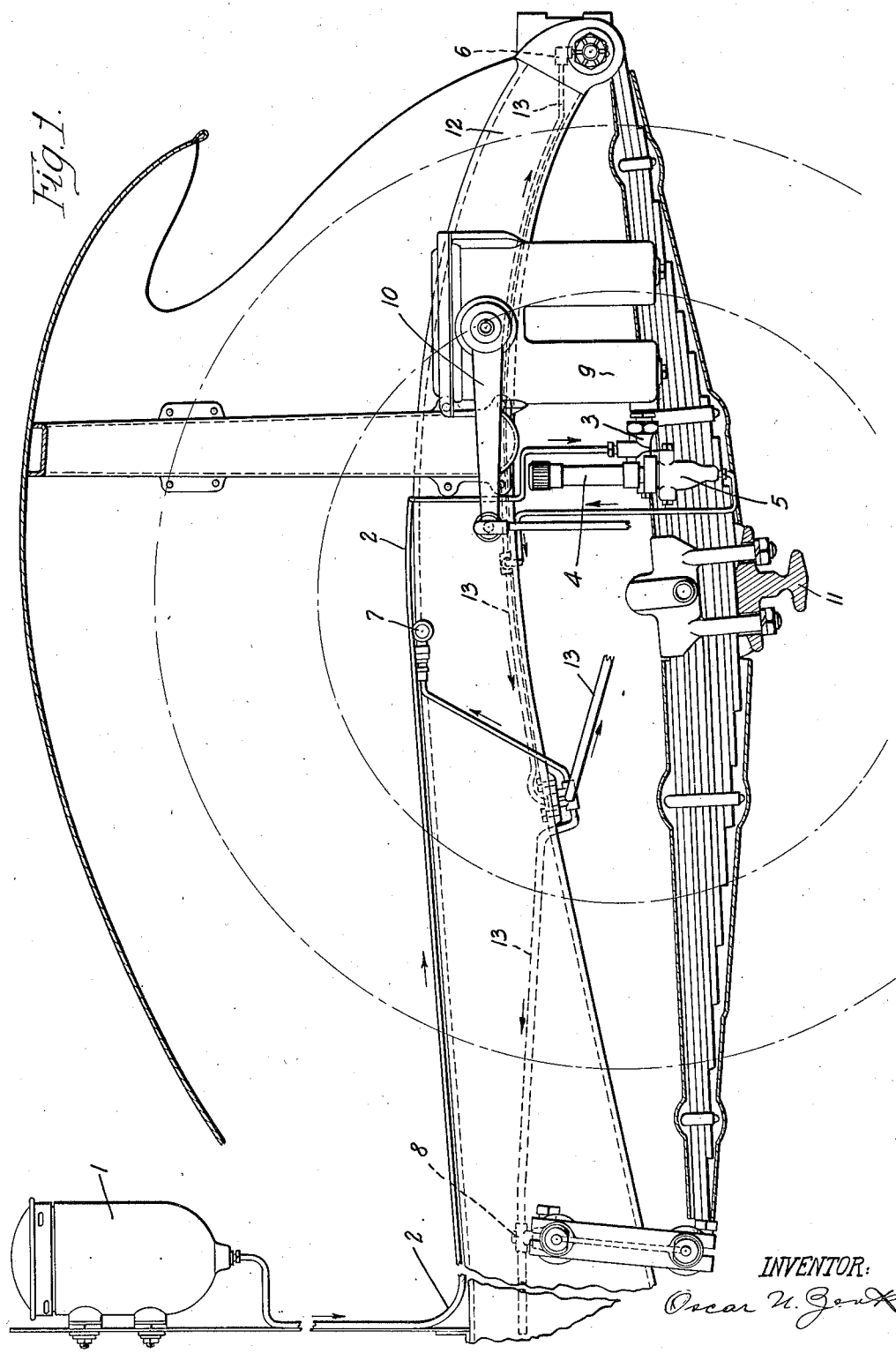

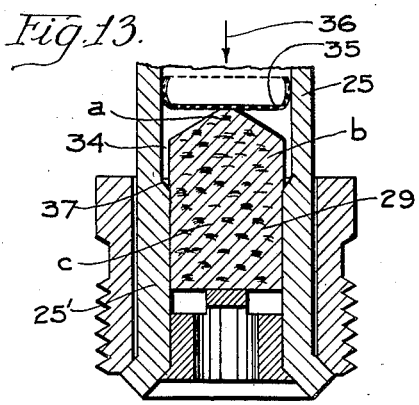
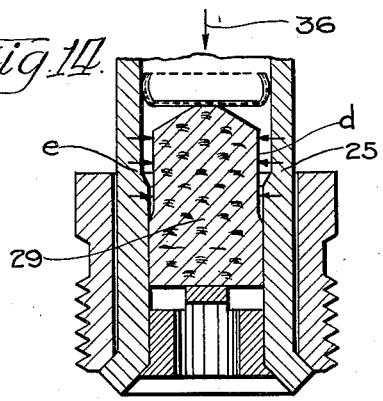
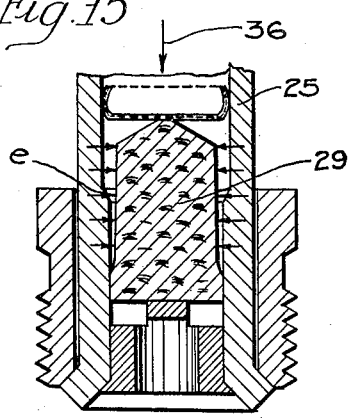
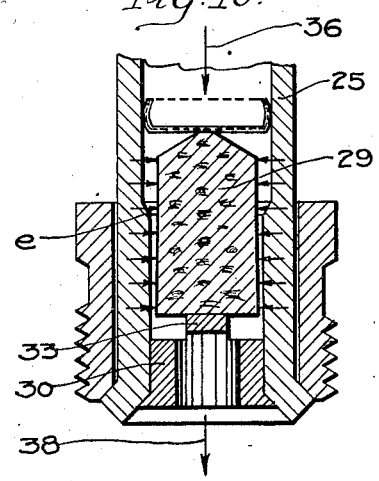

Patented Aug. 22, 1933

1,923,470

UNITED STATES PATENT OFFICE 1,923,470

CENTRALIZED LUBRICATING SYSTEM

Oscar U. Zerk, Chicago, Ill., assignor to Alemite Corporation, Chicago, Ill., a Corporation of Delaware Application November 9, 1929. Serial No. 406,110

50 Claims. (Cl. 184—7)

My invention relates to centralized lubrication, and while it is particularly applicable to automotive work, more particularly to the lubrication of the chassis of vehicles, such as automobiles, tractors, gun carriages, war tanks, locomotives, aeroplanes, airships, sea vessels, and the like, it is also adaptable to industrial lubrication, that is to the lubrication of stationary machines, such as stamping presses, printing presses, textile machinery, shafting and the various types of machines and machine tools employed in modern industry.

Prior systems of centralized lubrication commonly employ an oil pump connected to an oil reservoir, a pipeline system leading from the pump to the bearings, and metering units interposed between the pipeline and the various bearings. Of these metering units three types are commonly employed, namely, those of the pressure reservoir type, of the measuring valve type, and of the resistance unit type.

My invention involves the use of metering units of the resistance unit type.

Before the advent of the metering unit, plain check valves were commonly interposed between the pump employed in the lubricating system, and the bearings to control the flow of lubricant to the bearings. This prior system has proven to be unsatisfactory due to the variation in resistance offered by the valve to the flow, variations in valve spring pressure, the resulting variations in the height of the valve seat, and the difference in the dimensions of the oil passage leading to the valve seats being causes of some of the more disturbing variations in operation of different units of the same or different installations.

A larger oil passage and a weaker spring would effect a quicker and larger opening by the check valve than where a smaller passage and a stronger spring is used with another check valve. The lubricant under pressure always seeking the path of least resistance would be discharged through such first widely opened check valves and very little or no lubricant would pass through those relatively more closed.

One of the first types of resistance units made were composed of a resistance plug with a helical groove on its outside surface, which was fitted within a tube. These first resistance units also proved unsatisfactory because when placed at different levels, atmospheric pressure would enter the pipeline system, largely through more elevated units and oil would drain or siphon out, through relatively lower resistance units. In the effort to prevent this difficulty, both check valves and resistance units were provided in pairs. In such systems employing a valve and a resistance unit for each bearing, when the resistance of the resistance unit to the flow of lubricant was made greater than the resistance of the tightest bearing of the system, the system employing such resistance units each with a separate check valve unit operating as a flow controlling element, greater success was attained.

Of outlets employing both a resistance unit and a check valve, two types are commonly used:

One type employs a resistance plug and a spring pressed check valve of either the ball check valve type, or the flat check valve type comprising a metal disc backed by a spring and a relatively thin leather disc between the disc and the valve seat.

It has been found to be advantageous to make the contacting areas of the thin leather washer and valve seat very small in order to increase the pressure per square inch effective on the now substantially reduced contacting area. This was done for two reasons:

First, because it is then possible to employ a weak valve spring and at the same time to effect a high pressure per square inch between the contacting surfaces of the valve and valve seat;

Second, because it was discovered that because of variations of thickness of the relatively thin leather washer, and irregularities of its outer surface and variations of density thereof, a very uneven fit between the washer and the valve seat is had. An unreliable and leaky valve results if the contacting surfaces of the leather washer and the valve seat are not line-like but cover a relatively large area, except if a very powerful check valve spring is used, this being, however, undesirable, because it materially increases the pressure of lubricant required to unseat it, which in turn, would occasion additional serious difficulties in the design of a manual or automatically operated pump.

As a result of experiments I find that check valves of this last type which are forced against the valve seat with a relatively weak spring pressure have a tendency to leak, and when several combination resistance units and check valves are used in a pipeline system, atmospheric pressure will be caused to enter the more elevated check valve resistance units, with the result that the oil in the pipeline system, therefore, siphons out through the lower check valve resistance units, which is very undesirable.

While check valves faced with leather, having a narrow contacting area of so-called line-like form, operate much better than those with a larger contacting area, check valves of this character are still objectionable because atmospheric pressure enters the pipeline system, past the valves, with resulting drainage and siphoning, since the relatively small contacting surface is not absolutely leak proof, due to the fact that the pressure exerted against the valve seat cannot be made uniform over the entire area, since finely divided grit passes the finest filtering means, and becomes embedded in the soft, resilient leather or like means employed in this type of check valve construction.

To overcome this difficulty, a second type of check valve has sometimes been employed, wherein an exceedingly thin and flexible check valve material made of so-called empire cloth is employed, which better adapts itself to the small irregularities commonly prevailing in the valve seat surface, due to faulty workmanship, to grit settling on the valve seat.

I find, however, that such valves do not operate satisfactorily if additional spring pressure is used to force such an extremely thin and flexible valve against the valve seat, and that it is imperative that no such other force be employed that will detract from the natural adhesion or suction action of the oil, effecting the seal. I have, therefore, formerly designed a check valve of this type valve as a freely floating disc, floating within lateral bounds within very small limits, preferably not more than .025 part of an inch.

Such freely floating flexible disc valves work well, provided that the rest of the system is in perfect order. However, if atmospheric pressure enters the pipeline system, as through fine cracks in the pipeline, or through leaks of any of the many pipe couplings which may be faultily assembled, then the flexible thin check valve discs of the system, which are disposed at a relatively low level, will immediately open and much, if not all of the oil in the pipeline system drains out, which makes any further distribution of oil to the bearings impossible.

In my present invention, I avoid the above described serious difficulties, in a very simple and inexpensive manner, by means preferably comprising but a single resilient unit plug which takes the place of both the incompressible metal resistance unit plug and the separate check valve unit of the former resistance unit.

Such an improved single unit fulfills the expected properties of the formerly used separate resistance plug unit and the separate check valve unit. This new system does not only constitute a decided improvement upon former systems; it is not only far simpler, but also very much cheaper in design and assembly.

Instead of four pieces, which were formerly used in the above mentioned two units, only one single resilient plug is now used. Instead of using one cylindrical plug, two or more may be used providing the use of shorter pieces is cheaper than the use of one long piece. My preferred form is to use a resilient resistance plug made of one piece.

A resistance plug made of resilient material, like a cork in a bottle, very successfully and very reliably closes the outlet of a lubricant dispensing unit to the bearing and, therefore, should a small break in the pipeline occur, or from any other cause oil cannot siphon out through any or all of the bearings, and not a single one of my improved plug-like check valves will normally be opened. The great safety factor in this regard is an important part of my invention.

Check valves of prior types have been made and disposed to open by bodily movement of the valve from the cooperating check valve seat. Check valves of this type, depending upon spring action have proven to be unsatisfactory to function as a flow controlling element, and I therefore have provided for a progressive opening of the check valve.

By the definite phrase "progressively opening" employed herein, I do not mean that the check valve first bodily moves away a small distance from its seat and then, progressively, a larger and still larger distance; by "progressively opening" as employed herein, I mean that the different portions of the valve seat area are operated upon, sequentially, whereby the contacting area between the check valve and the check valve seat is progressively lessened.

This latter system possesses the great advantage that once the lubricant opens a channel between the resilient contacting element and the engaged portion of the resistance unit body, the contracted portion of the resilient element remains in substantially the same position.

This system also possesses the advantage that when the lubricant dispensing pressure has ceased and the resilient contacting element has again engaged the resistance unit body it very effectively seals the unit against flow of lubricant in the counter direction, thus efficiently functioning as a check valve, the sealing action thereof being effected by the inherently resilient characteristic of the material of which the check valve element is composed.

An object of my invention is to provide an improved one-piece combination resistance and check-valve element for a lubricating system.

Another object of my invention is to provide an improved combination resistance unit and check-valve for an element of a tubular conduit of a lubricating system.

Another object of my invention is to provide improved means for preventing siphoning or otherwise drawing oil from the pipe lines of a lubricating system employing a plurality of spaced dispensing outlets, during periods intervening between lubrication periods.

Another object of my invention is to provide an improved dispensing outlet for a bearing of a centralized lubricating system.

Another object of my invention is to provide an improved form of check-valve.

Another object of my invention is to provide a check valve of inherently resilient material.

Another object of my invention is to provide improved multiple connected outlets for a lubricating system pipe line.

Another object of my invention is to provide an improved resistance unit for a lubricating system.

Another object of my invention is to provide an improved check-valve for a lubricating system.

Another object of my invention is to provide as an integral unit, operating elements of a combination check-valve and resistance unit for a tubular dispensing outlet of a centralized lubricating system, which is insertable and/or removable as a unit therefrom.

Another object of my invention is to provide an improved method of effecting the dispensing of lubricant from a central source to a plurality of bearings served with lubricant by the source.

Another object of my invention is to provide an improved method of controlling the flow of lubricant to individual bearings of a lubricating system from a common source.

Another object of my invention is to provide an improved method of supplying lubricant to each of a plurality of bearings through a dispensing element individual to each bearing, and to provide against retractive loss of lubricant from the bearings after an initial supply of lubricant has been forced through the element to the bearing.

Another object of my invention is to provide an improved combination resistance and check-valve unit in a resistance body having a lubricant inlet in alignment with a suitable resilient combination plug.

Another object of my invention is to provide an improved dispensing element for a lubricating system wherein the contacting portion of the surface of a resilient element thereof is made sufficiently large as to successfully prevent leakage during non-lubricating periods, which otherwise might occur on account of grit embedded in such surface.

Another object of my invention is to provide a resilient plug for a conduit of a lubricating system, which will normally substantially close the conduit when the lubricant at the approach side thereof is under conditions of relatively low pressure.

Another object of my invention is to provide improved elements of combination resistance and check-valve units, which are adapted for interchangeable use in connection therewith, and by interchange will effect variable predetermined resistance effects to the lubricant sought to be forced past said elements under high pressure.

Another object of my invention is to provide an improved T-form resistance unit, wherein a resilient resistance plug element thereof may be readily removed for inspection, replacement or repair.

Another object of my invention is to accomplish the next aforesaid object in a manner wherein such removal may be accomplished simultaneously with the removal of the closing plug of the unit.

Another object of my invention is to provide improved resistance units for lubricating systems adapted to be interchangeably used to accomplish different resistance effects, but wherein the elements may be of substantially the same density.

Other objects of my invention and the invention itself will be apparent by reference to the following description of certain embodiments of my invention, and in which description reference will be had to the accompanying drawings illustrating the said embodiment wherein:

Fig. 1 is a side elevational view of a portion of the chassis of an automobile, parts being shown in section, showing mechanism consisting of a reservoir for lubricant and pumping and storage means therefor for supplying a lubricant system, at intervals, with lubricant under pressure from said source, a portion of the dispensing pipe line system and a few of the outlet fittings for the vehicle, being also shown therein.

Fig. 2 is a longitudinal medial sectional view of a dispensing outlet element for the lubricant system of Fig. 1, taken transversely of a bearing element to which it is affixed.

Fig. 3 is a plan view of a support for a combined resistance unit and valve element for the dispensing outlet element.

Fig. 4 is a view like that shown in Fig. 2 of another embodiment of my invention.

Fig. 5 is a view like that of Fig. 2 of a third embodiment of my invention.

Fig. 6 is a view like that shown in Fig. 2, of a fourth embodiment of my invention.

Figure 7:
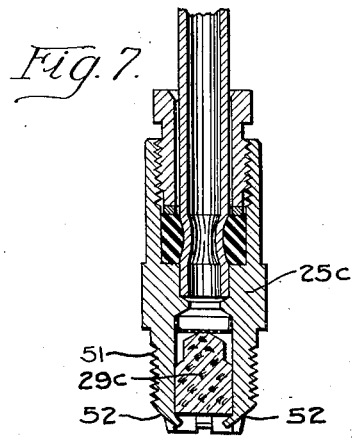
Fig. 7 is a longitudinal medial sectional view.

My present invention, while adaptable to a wider application, has a particular application in connection with dispensing outlet elements of a centralized lubricating system, wherein, commonly, a plurality of dispensing outlets are provided for a single system, and installed on a mechanism such as the chassis of an automobile or the like, one for each chassis bearing, all being interconnected by a pipe line of relatively small diameter, which receives lubricant under pressure, which travels from a common source.

Fig. 1 illustrates, partially, such a lubricating system, insofar as it shows a refillable reservoir 1, for lubricating oil, a conduit 2, for supplying lubricant from the reservoir 1, to a pumping mechanism shown generally at 3, having a reciprocating element, not shown, which is effective to accumulatively supply lubricant against a counter-pressure, in a pressure chamber 4.

From the chamber 4, by the operation of valve mechanism shown, generally at 5, lubricant is supplied to all of a number of dispensing outlet elements, such as 6, 7 and 8, a few of which only are shown in Fig. 1, secured to elements of the automobile chassis bearings, which support said outlet elements.

The centralized lubricating system partially illustrated in Fig. 1, is more completely illustrated and specifically described, in my copending application, Serial No. 389,181 filed August 29, 1929, to which reference is hereby made for a fuller and more complete disclosure of the portions of the mechanism indicated in Fig. 1, which supply lubricant to the dispensing outlet elements, such as 6, 7 and 8, and which are herein later described in various embodiments.

Generally, however, the actuating element of the lubricant pumping mechanism 3, may consist in a diaphragm exposed to fluctuating pressure of oil or other liquid communicated from the casing of a shock absorber mechanism 9, responsive to the reciprocatory movements of a crank arm, reciprocating responsive to road shocks, which effect relative movement of the axle 11 of the vehicle, and the spring supported chassis frame 12, which preferably carries the shock absorber casing 9.

The centralized lubricating system described in my copending application, Serial No. 394,363, filed September 21, 1929, to which reference is hereby made, is especially adaptable in connection with my present invention because the air compressor and the relatively large air pressure reservoir described in my copending application, exercises a substantially even pressure on the lubricant pump at all times, and, therefore, on my resistance unit shown in this application, which even pressure is a very important factor in securing even emission of oil where even emission is expected, and different emission of oil where different emission is expected.

As related in the preamble to this specification, lubricant dispensing outlet elements previously have been employed in centralized lubricating systems in many different types, and in the present application a new type of lubricant dispensing outlet, having means incorporated therein for controlling flow of lubricant to the bearing and preventing flow therefrom in the reverse direction, is disclosed and claimed, which involves a mode of operation quite different from that previously known.

In the accompanying drawings, in order to convey a proper understanding of the invention, it is illustrated in eight different embodiments, which are typical of dispensing outlet elements operating according to applicant's novel mode of operation.

Referring now first to the embodiment of my invention shown in Fig. 2, a supporting element of a bearing is shown therein at 14, and is of tubular form provided with a boss 15 recessed at 16, and bored at 17 to communicate lubricant from the recess to the bearing surfaces through an aperture 18 of a bearing bushing 19, which encircles a bearing pin or shaft 20.

Aligned lubricant conducting elements 13 and 13' of the lubricating system pipe line, are rigidly secured into oppositely extending laterally disposed bosses 21 and 22 of a tubular fitting 23, which comprises, also, a head boss 24 and a dispensing tube 25, said dispensing tube having a flared mouth 26 adapted to be clamped between an interposed gasket 27 in an end wall of the recess 16, by a clamping nut 26', which encircles the dispensing tube 25.

A rigid annulus 30, having a diametrical bridge 33, is forced tightly within the mouth of the dispensing tube 25, and its bridge 33 engages an end of a flow controlling element 29, which is forced into the dispensing tube 25, preferably through the head boss 24.

The flow controlling element 29 is preferably made of solid cork composition material, which may be made very accurate as to weight, density, and linear dimensions. The element 29 of the embodiment of Fig. 2, is preferably made in the form of a straight plug having cylindrical outer surfaces with opposed ends preferably respectively formed plane and conical, the plane end surface engaging said bridge 33.

The longitudinal bore of the fitting, including a preferably minor length of dispensing tube, is somewhat greater in diameter than the portion more immediately adjacent the plane end surface of the element 29.

By this provision, the lateral walls of the bore adjacent the cylindrical surface of the flow controlling element, which is adjacent its pointed end, is, as shown at 34, relieved from the opposed portion of the peripheral surface of the element 29.

The bore of the head boss 24 is threaded to receive a preferably metallic plug 32 screw threaded therein, said plug rigidly supporting a spacing rod 31, which engages the cylindrical portion of a metallic screen cup element 35 to press it firmly against the pointed end of the flow controlling element 29.

The operation of the apparatus of Fig. 2 will be better understood by reference to Figs. 13 to 16, which illustrate diagrammatically, as if in longitudinal medial section, the progressive deformation of the flow controlling plug 29 of Fig. 2, upon a condition wherein lubricant under pressure is admitted into the dispensing tube 25, as if from the direction of the arrow 36.

Fig. 13 shows the apparatus in its normal condition prior to any observable effect of lubricant pressure introduced through the upper end of the dispensing tube 25, such as, for instance would be the case where lubricant under high pressure is forced through the pipe line containing the sections 13 and 13', which is substantially closed to the egress of lubricant, except as lubricant may be dispensed through such elements, as that shown in Fig. 2.

The upper end of the element 29, shown at $b$, except for its pointed end $a$, is of perceptibly larger diameter than the base portion $c$, which is held inwardly compressed by the confining walls 25' of lesser diameter than the walls at 34, of relatively larger diameter.

Lubricant admitted from the end of the tube fragment shown, provided with a screen 35, would, as shown in Fig. 13, settle around the portions $a$ and $b$, but except for pressure of lubricant, the effect of which is shown in the other figures, would not proceed beyond the annular shoulder 37.

However, the high fluid pressure of the lubricant engaging the lateral preferably cylindrical surfaces $d$, as indicated by the inwardly extending arrows $e$, deforms the element 29 by compressing its outer surface inwardly below the shoulder 37, and this effect progressively continuing, as indicated by the successively larger number of arrows $e$, in Figs. 15 and 16, ultimately results in the entire lateral surface of the element 29 being inwardly compressed against the resiliency of the cork material of the element, providing a passageway along the longitudinal outer surfaces of the element 29, which, as illustrated in exaggerated view in the figures just described, permit lubricant to pass longitudinally over said outer surfaces, and through the support 30, toward the bearing, as indicated by the arrow 38.

Under the conditions of operation prevailing above, the flow controlling element 29 will also be exposed to pressure acting in the direction of the arrow 36, tending to displace the element longitudinally of the dispensing tube 25.

However, longitudinal movement is prevented by the engagement of the element 29 with the bridge 33 of the annulus 30 acting as a stop.

Lubricant will, therefore, pass the flow controlling element 29 in a quantity controlled by the pressure of the lubricant and the resistance offered by the element 29 to inward compression and the longitudinal and peripheral length of the surfaces of the plug, which normally contact with the walls of the encasing tube bore.

Sometimes elements such as 29 are made with relatively short lateral walls tending to effect a seal against the passage of lubricant, preferably longitudinally of such walls, in order that relatively less resistance be offered to the passage of lubricant.

Conversely also, sometimes such elements are employed of considerably greater length than those shown, and/or of greater diameter in order that the resistance to the flow of lubricant preferably longitudinally of the element be substantially increased.

Predetermined variations in response effects may also be accomplished by choosing flow controlling plug elements, such as shown at 29, of cork composition materials, of varying densities.

Any or all of the above methods for effecting variations in response effects may be used singly or in combination within the purview of my invention.

Referring now to the embodiment of my invention illustrated in Fig. 4, the stop element 30 is dispensed with therein and in its place the rod 31', rigidly secured to the metallic plug 32', extends axially of the fitting bore, longitudinally through the flow controlling element 29', and terminates in a wide head 39, which supports the plane end of the flow controlling element 29', which, except for its longitudinal bore, is otherwise like the element 29 of Fig. 2.

A metallic spacing tube 40, disposed intermediate the screen cup 35', and the inner end of the screw plug 32', and over the rod 31', longitudinally spaces the parts 29', and 35' from the plug 32'.

The rod 31' fits quite tightly within the bore of the element 29' to restrain flow of lubricant along the longitudinal surfaces of the rod, and sealing contact is also had between the engaging surfaces of the head 39 and the element 29'.

In this embodiment all of the parts, including the plug 32', rod 31' with the encircling spacing tube 40, the screen 35' and flow controlling element 29', are removable as a unit lengthwise of the fitting, and without detaching the pipe line elements 13 and 13' from the fitting, nor removing the fitting from the element 14 of the bearing.

By this provision the flow controlling unit and its protective screen may be removed for purposes of inspection, repair or replacement by another element for the same or a predetermined different resistance effect to the flow of lubricant under pressure.

In the embodiment of my invention shown in Fig. 5, the flow controlling element 29a is pressed snugly into an intermediate section of the successively stepped longitudinal bore of the fitting against a shoulder 41, formed by the junction of fitting bore portions of progressively decreased diameters.

At the same time, also, the element 39a is axially bored to receive an end of a rod 31a rigidly secured at its other end axially within the plug 32a.

A cup-shaped screen 35a is interposed in upright position between tubular spacing elements 40a and an annular spacing element 42, which, in turn is interposed between the screen and an annular end surface of the bored flow controlling element 29a.

The flow controlling element 29a is preferably of cork or like inherently compressible material, and is provided with an inlet bore portion 43, whereby lubricant under pressure is admitted to the longitudinal bore of the flow controlling element 29a, and thereafter progressively compresses the tubular walls of the element 29a outwardly in a radial direction successively and progressively proceeding towards the end of the rod 31a to provide a longitudinal passage for lubricant under pressure, through the longitudinal bore of the element 29a along the surfaces of the rod 31a.

The rod 31a is provided with a head 39a preferably spaced from the lower end of the flow controlling element, and engageable therewith upon retractive movements of the rod, accomplished by unscrewing the plug 32a from the head base 24a of the fitting.

From the description of operation of the first described embodiment of my invention, the mode of operation above related will be clear.

In both cases, after pressure forcing lubricant past the flow controlling element has become sufficiently reduced due to the resiliency of the material of the element, a tight closure of the passage to prevent return of the lubricant through the passage, is effected.

In Fig. 6, the apparatus is quite similar to that shown in Fig. 2, except that instead of the lateral surfaces of the flow controlling element 29b, being relieved near the pointed end of the element by enlargement of the bore of the fitting adjacent such portions, in the embodiment of Fig. 6 the diameter of the portion b' of the element itself is reduced to accomplish inward spacing of the outer surfaces of the end of the element to admit lubricant under pressure, to initiate the progressive compressive action described and illustrated in connection with Figs. 13 to 16 inclusive, and which, therefore, need not be repeated here.

In order to indicate the method of connecting the terminal end of lubricant conducting pipe section, such as 13a, to a tubular flow controlling fitting, where such pipe section extends in a direction longitudinal of the fitting, in Fig. 6, this is shown as susceptible of being effected by providing a tubular fitting end 44 into which an annulus 45 of rubber or like material is disposed with the end of the pipe projected into a longitudinal bore of the annulus, and the pipe end and annulus is tightly clamped by a bored screw 46 encircling the pipe, screw threaded into the end 44 of the fitting against the annulus.

The rubber annulus 45 being longitudinally compressed, being of elastic plastic material, and restrained by the outer walls of the fitting, flows inwardly, thereby effecting a deforming annular constriction 47 in the walls of the pipe at a point spaced from its end 48.

The pipe is thereby removably secured rigidly in the fitting to communicate lubricant to the bearing under the control of the element 29b, as described.

In Fig. 7 the structure is like that shown in Fig. 6, except that the dispensing tube 25c terminates in an externally threaded end 51, adapted to be screw threaded directly into an internally threaded boss of a bearing element, such as that shown at 15, in Fig. 2.

Also in this figure, the flow controlling element 29c is restrained from longitudinal movement in the direction of flow of the lubricant by integral inturned fingers 52 at the end of the dispensing tube 25c.

Figure 8:
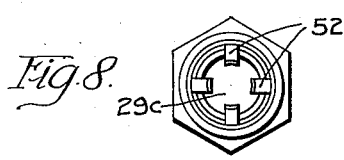
Fig. 8 is an end plan view, of a fifth embodiment of my invention.

Fig. 8 shows the relative arrangement of a plurality of said fingers 52.

Figure 9:
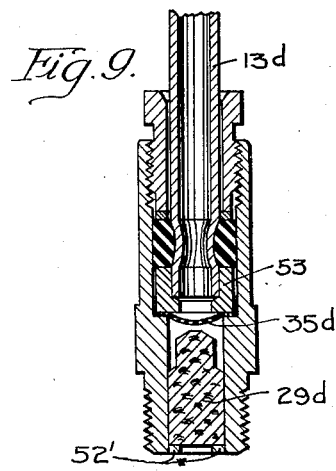
Fig. 9 is a longitudinal medial sectional view.
Figure 10:
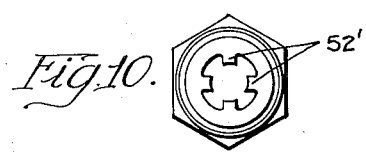
Fig. 10 is a bottom plan view of a sixth embodiment of my invention.

In Figs. 9 and 10, a variation in the form of the cup-shaped screen 35d is had wherein the lateral walls of the screen are interposed between lateral walls of an annulus 53 surrounding the end of the pipe section 13d. Also the form of the inturned fingers 52' for restraining the flow controlling element 29d from longitudinal movement, is somewhat different from that shown in Figs. 7 and 8.

Figure 11:
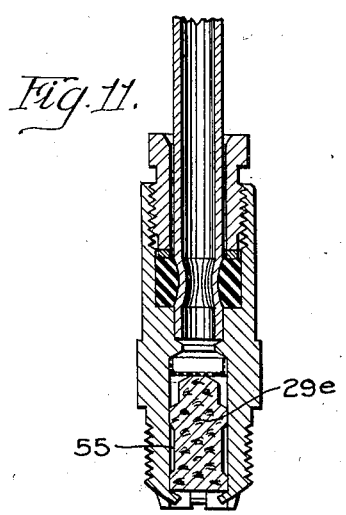
Fig. 11 is a longitudinal medial sectional view of a seventh embodiment of my invention.

In Fig. 11, a variation in the form of the flow controlling element 29e is had from that shown, for instance, in Fig. 7.

This variation consists in first providing the outer surface of the element 29e with an annular groove 55, and second, in making the element 29e somewhat longer than that shown in Fig. 7. I find that the provision of one or more of such grooves 55 is quite effective to accomplish a very efficient form of element for about the same reasons that annular grooves on the outer surfaces of a piston are more effective to prevent flow of fluid longitudinally of the piston than an ungrooved outer cylindrical piston surface.

Figure 12:
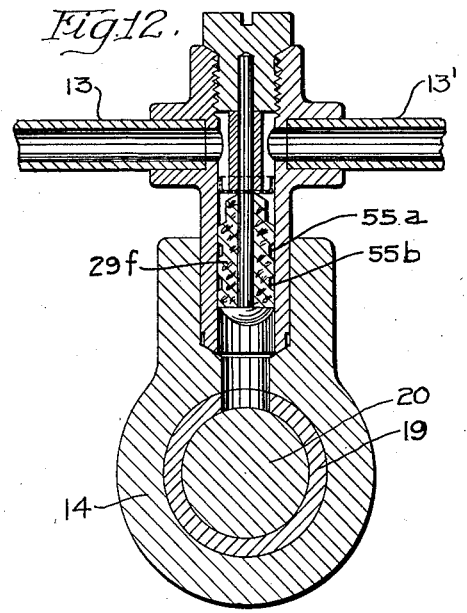
Fig. 12 is a longitudinal medial sectional view of an eighth embodiment of my invention, and Figs. 13 to 16 inclusive illustrate diagrammatically successive stages of operation of a flow controlling element, such as that shown in Fig. 2.

In Fig. 12 I disclose a plurality of grooves 55a and 55b, each longitudinally spaced from the other and from the ends of the element 29f; in Fig. 12 the fitting otherwise is like that of Fig. 4, and requires no additional description.

Having thus described my invention in a number of different embodiments, I am aware that numerous and extensive departures may be made from the embodiments herein illustrated and described, and the method is susceptible of variation without departing from the novel mode typical of my invention, and that the flow controlling elements, such as that shown at 29, 29', 29a, 29b, 29c, 29d, 29e, 29f, may be made in varying lengths, of varying diameters, either having grooved or ungrooved lubricant passing surfaces.

The materials thereof may be made of varying densities and of varying degrees of hardness to accomplish predetermined resistance effects to the flow of lubricant past the lubricant passage surfaces of the element, and within the scope of my invention I contemplate providing a plurality of elements such as those enumerated for each fitting, each adapted to effect a different resistance to flow of lubricant past its lubricant flow resistant surface.

However, such varying embodiments and practices are within the spirit of my invention and are, therefore, embraced by the appended claims.

I claim:

1. In a lubricating system, a lubricant conduit, a compressible valve element filling and sealing the conduit by resiliently engaging the wall thereof, and adapted to be compressed to smaller cross-sectional area than that of the conduit to unseal the conduit by pressure of lubricant in the conduit.

2. In a lubricating system, a lubricant conduit, a compressible valve element in the conduit resiliently engaging the conduit wall and sealing the same on a longitudinally extending portion of the conduit and adapted to be compressed progressively longitudinally to unseal the conduit by pressure of lubricant in the conduit.

3. In a lubricating system, a lubricant conduit, a compressible valve element in the conduit resiliently engaging the conduit wall and sealing the same on a longitudinally extending portion of the conduit and adapted to be compressed radially inwardly and also compressed progressively longitudinally to unseal the conduit by pressure of lubricant in the conduit.

4. In a lubricating system, a lubricant conduit, having a sealable longitudinally extending wall portion and a valve portion filling and sealingly engaging the said wall portion, one of said portions being composed of compressible material and adapted to be compressed by pressure of lubricant in the conduit to unseal the conduit.

5. In a lubricating system, a lubricant conduit having a sealable longitudinally extending wall portion and a valve portion filling and sealingly engaging the said wall portion, one of said portions being composed of compressible material and adapted to be compressed progressively longitudinally to unseal the conduit.

6. In a lubricating system, a lubricant conduit having a sealable longitudinally extending wall portion and a valve portion filling and sealingly engaging the said wall portion, one of said portions being composed of compressible material and adapted to be compressed to progressively longitudinally change the relative cross-sectional areas of the wall portion and valve portion to unseal the conduit by pressure of lubricant in the conduit.

7. In a lubricating system, a lubricant conduit having a longitudinally extending sealable wall portion, a longitudinally extending valve element of compressible material normally compressibly engaging and sealing the wall portion and adapted to be compressed to smaller than normal cross-sectional area to unseal the conduit by pressure of lubricant in the conduit above a predetermined value.

8. In a lubricating system, a lubricant conduit, means for supplying lubricant to the conduit under pressure, a sealable longitudinally extending wall portion of the conduit and a valve portion filling and sealingly engaging the same, means for preventing longitudinal movement of the valve portion in the conduit due to pressure of the lubricant, one of said portions being composed of compressible material and adapted to be compressed progressively longitudinally to unseal the conduit at lubricant pressure above a predetermined value.

9. In a lubricating system, a lubricant conduit, means for supplying lubricant to the conduit under pressure, a sealable longitudinally extending wall portion of the conduit and a valve portion filling and sealingly engaging the same, means for preventing longitudinal movement of the valve portion in the conduit due to pressure of the lubricant, one of said portions being composed of compressible material and adapted to be compressed to progressively longitudinally change the relative cross-sectional areas of the wall portion and valve portion to unseal the conduit by lubricant pressure above a predetermined value.

10. In a lubricating system, a lubricant conduit, means for supplying lubricant to the conduit under pressure, a longitudinally extending sealable wall portion of the conduit and a longitudinally extending valve element of compressible material normally compressibly engaging and sealing the wall portion and adapted to be compressed to smaller than normal cross-sectional area to unseal the conduit by pressure of lubricant in the conduit above a predetermined value and means for preventing longitudinal movement of the valve element in the conduit by lubricant pressure.

11. In a lubricating system, a lubricant conduit, means for supplying lubricant to the conduit under pressure, a compressible valve element filling and sealing the conduit by resiliently engaging the wall thereof and adapted to be compressed to smaller cross-sectional area than that of the conduit to unseal the conduit by pressure of lubricant in the conduit above a predetermined value and means for preventing movement of the valve element longitudinally of the conduit by the lubricant pressure.

12. In a lubricating system, a lubricant conduit, means for supplying lubricant to the conduit under pressure, a longitudinally extending sealable wall portion of the conduit and a valve portion filling and sealingly engaging the said wall portion and exposed to the pressure of the lubricant, one of said portions being composed of compressible material and adapted to be compressed by pressure of lubricant in the conduit to unseal the conduit and means for preventing movement of the valve portion in the direction of pressure of the lubricant.

13. In a lubricating system, a lubricant conduit, means for supplying lubricant to the conduit under pressure, a compressible valve element in the conduit resiliently engaging the conduit wall and sealing the same upon a longitudinally extending portion of the conduit and adapted to be inwardly radially and progressively longitudinally compressed to unseal the conduit by lubricant pressure above a predetermined value and means to prevent movement of the valve element in the conduit in the direction of the lubricant pressure.

14. In a lubricating system, a lubricant conduit, means for supplying lubricant to the conduit under pressure, the conduit having a sealable longitudinally extending wall portion, a valve element in the conduit filling and sealingly engaging the wall portion, a lubricant retaining recess in the valve portion adjacent the wall portion, one of said portions being composed of compressible material and adapted to be compressed progressively longitudinally to unseal the conduit by lubricant pressure above a predetermined value and means for preventing longitudinal movement of the valve element by pressure of lubricant thereon.

15. In a lubricating system, a lubricant conduit, means for supplying lubricant to the conduit under pressure, a conduit having a sealable longitudinally extending wall portion, and a longitudinally extending valve element of compressible material normally compressibly engaging and sealing the wall portion and adapted to be compressed to smaller than normal cross-sectional area to unseal the conduit by pressure of lubricant in the conduit above a predetermined value, an oil retaining recess in the valve element adjacent the wall portion and means for preventing longitudinal movement of the valve element in the wall portion by pressure of lubricant thereon.

16. In a lubricating system in combination with a bearing element to be lubricated, a lubricant fitting, a conduit therein, a valve element filling and sealingly engaging the conduit, means for subjecting the valve element to the fluid pressure of lubricant in the conduit, means for preventing movement of the valve element by said fluid pressure and the valve element being composed of compressible material whereby upon pressure above a predetermined value the valve element may be compressed to unseal the conduit and permit lubricant to flow to the bearing element.

17. In a lubricating system, a bearing element to be lubricated, a lubricant fitting adapted to be secured to the bearing element, a lubricant conduit in the fitting, means for securing a lubricant supply pipe to the fitting whereby lubricant under pressure may be supplied to the conduit, a longitudinally extending wall portion of the conduit, a longitudinally extending valve portion filling and sealingly engaging the wall portion, one of said portions being composed of compressible material and adapted to be compressed to unseal the conduit and permit lubricant to flow to the bearing element at lubricant pressure above a predetermined value.

18. In a lubricating system, a bearing element to be lubricated, a lubricant fitting adapted to be secured to the bearing element, a lubricant conduit in the fitting, means for securing a lubricant supply pipe to the fitting whereby lubricant under pressure may be supplied to the conduit, a longitudinally extending wall portion of the conduit, a longitudinally extending valve portion filling and sealingly engaging the wall portion, one of said portions being composed of compressible material and adapted to be compressed to unseal the conduit and permit lubricant to flow to the bearing element at lubricant pressure above a predetermined value, and means for preventing longitudinal movement of the valve element in the conduit due to lubricant pressure.

19. In a lubricating system in combination with a bearing element to be lubricated, a lubricant fitting adapted to be secured to the bearing element, a conduit in the fitting, a longitudinally extending valve element filling and sealing the conduit, a lubricant supply pipe secured to the fitting and communicating with the conduit, means for supplying lubricant under pressure to the conduit through the pipe, the valve element being composed of compressible material and adapted to be compressed to unseal the conduit and permit lubricant to flow to the bearing element at lubricant pressure above a predetermined value, an opening in the fitting through which the valve element may be inserted into the conduit into sealing position therein or removed therefrom and means for sealing the opening.

20. In a lubricating system in combination with a bearing element to be lubricated, a lubricant fitting adapted to be secured to the bearing element, a conduit in the fitting, a longitudinally extending valve element filling and sealing the conduit, a lubricant supply pipe secured to the fitting and communicating with the conduit, means for supplying lubricant under pressure to the conduit through the pipe, the valve element being composed of compressible material and adapted to be compressed to unseal the conduit and permit lubricant to flow to the bearing element at lubricant pressure above a predetermined value, an opening in the fitting, a plug for sealing the opening and a connecting element between the plug and the valve element whereby the plug element, connecting element and valve element may be inserted through the opening or removed therefrom as a unit.

21. In a lubricating system, a lubricant fitting adapted to be secured to a bearing element to be lubricated, a portion on the element to which a lubricant conducting pipe is adapted to be secured, a conduit in the fitting, means for supplying lubricant to the conduit through the pipe under pressure, an opening in the fitting, a closure element for the opening adapted to close and seal the opening, a connecting element secured to the closure element, a valve element connected to the closure element, the valve element being adapted to be inserted in the conduit upon closure of the opening by the closure element, and the valve element sealingly filling the conduit and adapted to be unsealed by lubricant pressure above a predetermined value.

22. In a lubricating system, a lubricant fitting adapted to be secured to a bearing element to be lubricated, a conduit in the fitting, means for detachably sealingly connecting a lubricant pressure supply pipe to the fitting, a valve element filling and sealing the conduit on a longitudinally extending portion thereof, the valve element being composed of laterally expansible material whereby at lubricant pressure above a predetermined value the valve element may be laterally compressed to permit flow of lubricant through the conduit and means for preventing bodily movement of the valve element longitudinally in the conduit.

23. As an article of manufacture, a lubricant fitting adapted to be secured to a bearing element to be lubricated, a conduit in the fitting, a valve element composed of compressible non-flowing material filling and sealing the conduit, means for preventing longitudinal movement of the valve element in the conduit.

24. In a lubricating system, a lubricant fitting adapted to be secured to a bearing element to be lubricated, a conduit in the fitting, means for detachably sealingly connecting a lubricant pressure supply pipe to the fitting, a valve element filling and sealing the conduit on a longitudinally extending portion thereof, the valve element being composed of laterally expansible material whereby at lubricant pressure above a predetermined value the valve element may be laterally compressed to permit flow of lubricant through the conduit and means for preventing bodily movement of the valve element longitudinally in the conduit, and a lubricant straining element for the valve element.

25. As an article of manufacture, a lubricant fitting adapted to be secured to a bearing element to be lubricated, a conduit in the fitting, a valve element composed of cork filling and sealing the conduit, means for preventing longitudinal movement of the valve element in the conduit.

26. As an article of manufacture, a lubricant fitting adapted to be secured to a bearing element to be lubricated, a conduit in the fitting, a valve element composed of compressible non-flowing material filling and sealing the conduit, means for preventing longitudinal movement of the valve element in the conduit, and an annular lubricant retaining groove circumscribing the valve element.

27. As an article of manufacture, a lubricant fitting adapted to be secured to a bearing element to be lubricated, a conduit in the fitting, a valve element composed of compressible non-flowing material filling and sealing the conduit, means for preventing longitudinal movement of the valve element in the conduit, and a plurality of annular lubricant grooves circumscribing the valve element.

28. As an article of manufacture, a lubricant fitting adapted to be secured to a bearing element to be lubricated, a conduit in the fitting, a valve element composed of compressible non-flowing material filling and sealing the conduit, means for preventing longitudinal movement of the valve element in the conduit, and a lubricant retaining groove in that portion of the valve element sealing the conduit.

29. As an article of manufacture, a lubricant fitting, a conduit in the fitting, a longitudinally extending valve element filling and sealing the conduit composed of laterally compressible material, and of reduced diameter at a longitudinal end thereof and means for preventing longitudinal movement of the valve element in one direction.

30. As an article of manufacture, a lubricant fitting, a conduit in the fitting, a longitudinally extending valve element filling and sealing the conduit and composed of laterally compressible material, the valve element and conduit being relatively relieved at a longitudinal end portion of the valve element.

31. As an article of manufacture, a lubricant fitting, a conduit in the fitting having a longitudinally extending wall portion, a longitudinally extending valve portion filling and sealing the wall portion, one of said portions being composed of compressible material and the cross-sectional area of one of said portions varying adjacent one end of the valve portion to provide clearance between the valve portion and the wall portion.

32. As an article of manufacture, a lubricant flow controlling element comprising a tubular conduit and a plug of cork compressibly filling and sealing the tube and acting as a valve therein.

33. As an article of manufacture, a lubricant flow controlling element comprising a tubular conduit and a plug of cork compressibly filling and sealing the tube and acting as a valve therein, and means for preventing longitudinal movement of the plug in the tube.

34. As an article of manufacture, a lubricant flow controlling element comprising a tubular conduit and a plug of cork compressibly filling and sealing the tube and acting as a valve therein, and means for preventing longitudinal movement of the plug in the tube in one direction.

35. A lubricant flow controlling element comprising a tube, means for connecting a lubricant supply pipe to the tube, a plug of laterally compressible material compressibly retained in the tube and acting as a valve therein, and means for preventing longitudinal movement of the plug in the tube in one direction.

36. In a lubricating system, a lubricant flow controlling element comprising a tube, means for connecting a lubricant supply pipe to the tube, a plug of laterally compressible material compressibly retained in the tube and means for preventing longitudinal movement of the plug in the tube in one direction, and a lubricant strainer between the plug and the supply pipe connection.

37. As an article of manufacture, a lubricant flow controlling valve element comprising a generally cylindrical body of cork reduced in diameter at one end.

38. As an article of manufacture, a lubricant flow controlling valve element comprising a generally cylindrical body of cork reduced in diameter at one end and provided with an annular groove therein.

39. As an article of manufacture, a lubricant flow controlling valve element comprising a generally cylindrical body of cork provided with an annular groove therein.

40. As an article of manufacture, a valve unit for a lubricant flow controlling fitting comprising a valve element of compressible material, a connecting element and a fitting plug connected together.

41. As an article of manufacture, a valve unit for a lubricant flow controlling fitting comprising a valve element of compressible material, a connecting element and a fitting plug and a valve strainer screen connected together.

42. As an article of manufacture, a valve unit for a lubricant flow controlling fitting comprising a connecting element and a fitting plug, a valve element composed of compressible material, a spacer between the plug and valve and a valve straining screen associated with the connecting element.

43. As an article of manufacture, a valve unit for a lubricant flow controlling fitting comprising a linearly arranged fitting plug, spacing element, lubricant straining screen and valve element composed of compressible material all connected together.

44. As an article of manufacture, a renewable valve assembly for a lubricant flow controlling element comprising a valve element of compressible material, a lubricant screen and a fitting plug linearly disposed and connected together.

45. As an article of manufacture, a renewable valve assembly for a lubricant flow controlling element comprising a fitting plug, a stem secured thereto, a head on the stem and a generally cylindrical valve element of compressible material on the stem between the head and the plug.

46. As an article of manufacture, a renewable valve assembly for a lubricant flow controlling element comprising a fitting plug, a stem secured thereto, a head on the stem and a generally cylindrical valve element of cork material on the stem between the head and the plug.

47. As an article of manufacture, a renewable valve assembly for a lubricant flow controlling element comprising a fitting plug, a stem secured thereto, a head on the stem and a generally cylindrical valve element of compressible material on the stem between the head and the plug and a lubricant screen between the valve element and the plug.

48. In a lubricating system, a lubricant conduit and a check valve sealing the conduit against counter flow and composed of inherently resilient expansible material sealingly engaging the conduit wall.

49. In a metering unit, a conduit portion terminating in a valve seat sealed by pressure contact of a compressible valve element forcibly held thereon against fluid pressure below a predetermined value and adapted to be unsealed by fluid pressure above a predetermined value by compression of the valve material.

50. In a metering unit, a valve seat, a valve element of compressible material on the seat and rigid unyielding means for forcibly holding the valve element on the seat.

OSCAR U. ZERK.